(12) United States Patent
Plabst et al.

(10) Patent No.: US 12,377,763 B2
(45) Date of Patent: Aug. 5, 2025

(54) DRIVER'S SEAT FOR A RAIL VEHICLE

(71) Applicant: Siemens Mobility GmbH, Munich (DE)

(72) Inventors: Roland Plabst, Alling (DE); Josef Denk, Tegernsee (DE)

(73) Assignee: Siemens Mobility GmbH, Munich (DE)

( * ) Notice: Subject to any disclaimer, the term of this patent is extended or adjusted under 35 U.S.C. 154(b) by 384 days.

(21) Appl. No.: 18/013,641

(22) PCT Filed: May 27, 2021

(86) PCT No.: PCT/EP2021/064140
§ 371 (c)(1),
(2) Date: Dec. 29, 2022

(87) PCT Pub. No.: WO2022/002490
PCT Pub. Date: Jan. 6, 2022

(65) Prior Publication Data
US 2023/0302973 A1    Sep. 28, 2023

(30) Foreign Application Priority Data

Jun. 29, 2020  (DE) ...................... 10 2020 207 998.6

(51) Int. Cl.
*B60N 2/52* (2006.01)
*B60N 2/06* (2006.01)
(Continued)

(52) U.S. Cl.
CPC ............... *B60N 2/525* (2013.01); *B60N 2/06* (2013.01); *B60N 2/14* (2013.01); *B60N 2/502* (2013.01);
(Continued)

(58) Field of Classification Search
CPC . B60N 2/525; B60N 2/14; B60N 2/24; B60N 2002/022; B60N 2/502; B60N 2/06; B61D 33/0085
See application file for complete search history.

(56) References Cited

U.S. PATENT DOCUMENTS 2,653,648 A * 9/1953 Marshall .................. A47C 1/11
60/431
5,176,355 A * 1/1993 Carter .................... B60N 2/502
248/564

(Continued)

FOREIGN PATENT DOCUMENTS

CN    108382277 A    8/2018
DE    4123410 A1    1/1993
(Continued)

*Primary Examiner* — Milton Nelson, Jr.

(57) ABSTRACT

A driver's seat for a rail vehicle includes a seat, a frame, a support, a fastening unit and a compressed air line, ensuring compressed-air-assisted functionalities of the driver's seat. The frame supporting the seat is mounted rotatably and connected to a first end of the support permitting the seat to rotate about an axis of the support. A second end of the support is connected to the fastening unit, fastening the seat in a vehicle control console. The air line ensures compressed-air-assisted seat functionalities and has a first region with partial coils running around the support at a predefined distance. The partial coils are formed and fastened such that rotational movement of the seat effects a change in distance of the partial coils relative to the support. The partial coils of the air line form a spiral, wound around the support at a predefined distance.

14 Claims, 2 Drawing Sheets

(51) Int. Cl.
  *B60N 2/14*   (2006.01)
  *B60N 2/50*   (2006.01)
  *B61D 33/00*  (2006.01)

(52) U.S. Cl.
  CPC ......... *B60N 2/505* (2013.01); *B61D 33/0085* (2013.01)

(56) References Cited

U.S. PATENT DOCUMENTS

| | | | |
|---|---|---|---|
| 7,758,007 B2 * | 7/2010 | Link | B60N 2/005 297/344.21 |
| 10,919,417 B2 * | 2/2021 | Haller | E02F 9/166 |
| 2004/0051023 A1 | 3/2004 | Bryngelson et al. | |
| 2005/0178755 A1 | 8/2005 | Ulbrich | |

FOREIGN PATENT DOCUMENTS

| | | |
|---|---|---|
| DE | 102004058913 A1 | 6/2006 |
| DE | 102009017461 A1 | 10/2010 |
| DE | 102013214779 A1 | 1/2015 |
| EP | 2374654 A1 | 10/2011 |
| JP | 2005200009 A | 7/2005 |
| KR | 20010078624 A | 8/2001 |
| KR | 20040035658 A | 4/2004 |

\* cited by examiner

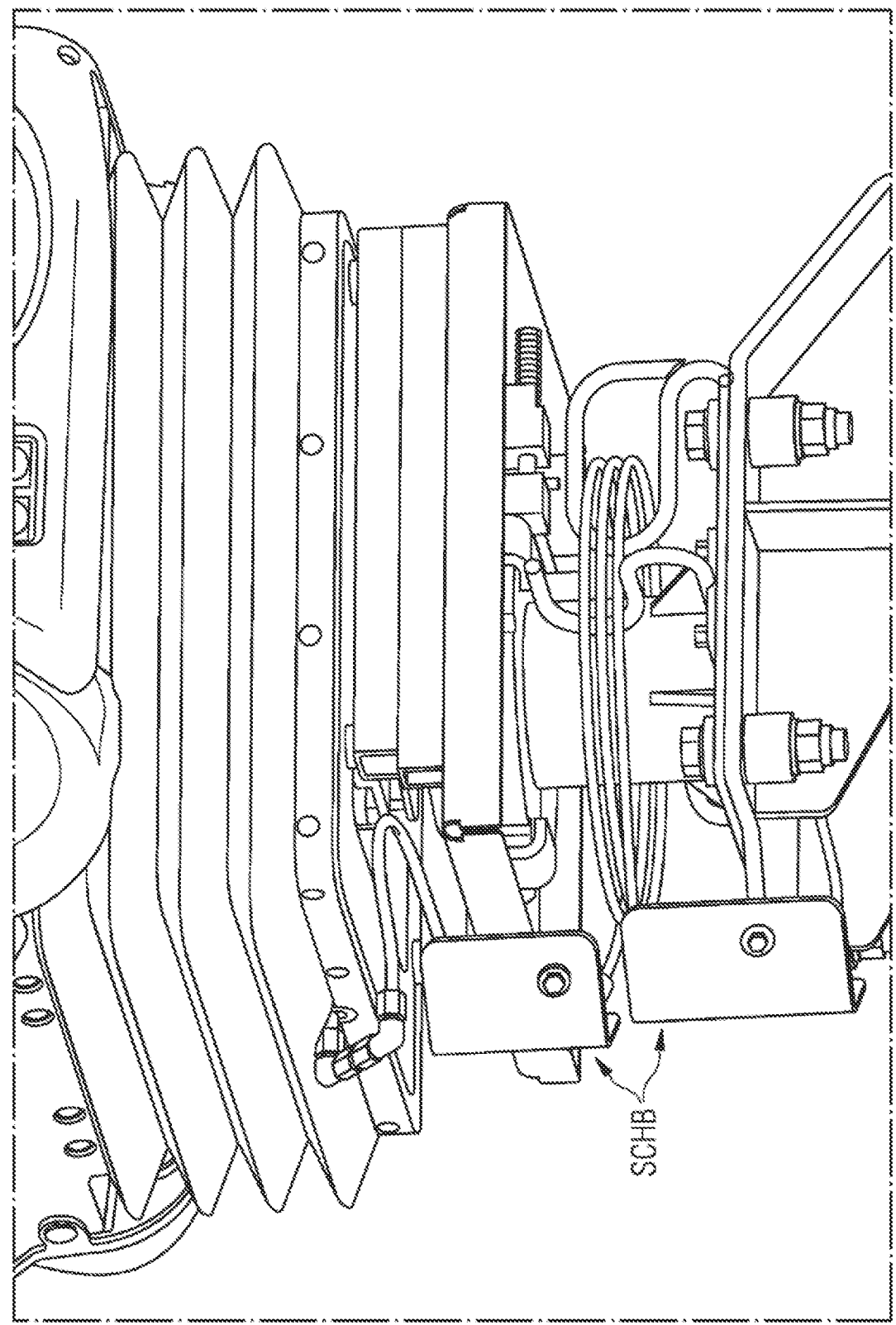

DRIVER'S SEAT FOR A RAIL VEHICLE

FIELD AND BACKGROUND OF THE INVENTION

The invention relates to a driver's seat for a rail vehicle, in particular a train driver's seat.

An extremely wide range of driver's seats with different functionalities are known for rail vehicles.

Simpler and cheaper rail vehicle driver's seats normally have a moderate level of spring comfort, which is realized by means of mechanical springing.

In these driver's seats, pneumatic and/or electric assistance for the ergonomic adjustment of the driver's seat to the needs of the rail vehicle driver is also dispensed with because of the costs.

More complicated driver's seats are normally compressed-air assisted and have substantially higher comfort and additional functionalities (e.g. these provide lower lumbar support or assistance for the rail vehicle driver during a seat adjustment carried out by the driver).

Such compressed-air assisted driver's seats have a corresponding compressed air supply, in which a compressed air hose is usually guided in the interior of a vertical hollow steel tube. The actual seat for the rail vehicle driver is fastened to this steel tube (e.g. via a screw connection or via a welded connection). The compressed air hose is not rigid but flexible and is guided in such a way that rotational movements of the seat in the horizontal plane are made possible.

As a result, the compressed air hose is located in the region of the axis of rotation of the seat, so that a right-left rotation of the seat about the axis of rotation in the horizontal plane is easily possible. Advantageously, the compressed air hose is only slightly twisted here.

As a further advantage, the flexible compressed air hose also permits a forward-backward movement of the seat to a low extent, which is necessary as a result of a seat adaptation to the rail vehicle driver.

The disadvantage with this concept is that limits with respect to possible movement travels (maximum rotational angles and maximum displacement travels) are reached relatively quickly.

Furthermore, the concept described is not suitable for all conceivable configurations. For example, if there is a bearing point of the seat under the seat, it is necessary to dispense with a hollow shaft and therefore with the central hose guidance.

An alternative solution for an off-center compressed air guidance, according to the prior art, consists in arranging a single flexible hose with a large loop in such a way that movements are permitted. This loop is then located between the fixed and the rotatable and displaceable part of the seat and typically projects a long way. As a result, there is the danger of damage to the hose as an individual walks past or during rotation of the seat.

The document EP 2374654 discloses a vehicle which has a driver's seat with a driver' cab floor and a seat console arranged to be movable relative to the driver's cab floor and having hose-like line guidance.

The document US20040051023 A1 discloses a seat assembly for a motor vehicle having an air spring suspension system.

SUMMARY OF THE INVENTION

The object of the present invention is, therefore, to provide an improved driver's seat for a rail vehicle with which the aforementioned disadvantages can be overcome cost effectively.

This object is achieved by the features of the independent claim. Advantageous developments are specified in the respective dependent claims.

The invention relates to a driver's seat for a rail vehicle, in particular a train driver's seat.

The driver's seat includes a seat, frame, a support and a compressed air line, which ensures compressed-air assisted functionalities of the driver's seat.

The seat is designed for use by a rail vehicle driver.

The frame which supports the seat is rotatably connected to a first end of the support such that the seat is rotatable about an axis of the support. A second end of the support is connected to a fastening unit. The compressed air line is arranged in relation to the seat, the frame and the support in such a way that the compressed air assisted functionalities of the seat are insured.

According to the invention, the compressed air line in a first region is implemented as a number of partial coils, which run at least partly around the support at a predefined distance. The partial coils are formed and fastened in such a way that a rotational movement of the seat effects a change in the distance of the at least one partial coils relative to the support.

In an advantageous development, the compressed air line in a second region is implemented as at least one partial loop. It is designed and fastened in such a way that a translational movement of the seat effects a change in the shape of the partial loop. The translational movement, which is preferably carried out in a horizontal plane, effects a change in the shape in which the compressed air line is laid and results in compression or extension of the partial loop.

In an advantageous development, the partial coils run radially around the support. The rotational movement of the seat, which is preferably carried out in the horizontal plane, effects a change in the shape in which the compressed air line is laid and results in a change of the radius of the partial coils.

In an advantageous development, the second end of the support is connected to the fastening unit in order to fasten the support in a control console of the rail vehicle.

In an advantageous development, a pneumatic suspension and/or a pneumatic seat adjustment, to which the compressed air line is fed to implement and ensure the pneumatic functionality, is arranged between the frame and the seat.

In an advantageous development, the support is formed as a tube or as a profile, which is arranged standing substantially vertically between the fastening unit and the frame.

In an advantageous development, the first region of the compressed air line is connected at its first end to the fastening unit and at its second end to the frame, in order to permit the change in distance and change in radius of the at least one partial coil.

In an advantageous development, the second region of the compressed air line is connected at its first end to the seat and/or to the pneumatic suspension and/or to the pneumatic seat adjustment, while its second end is connected to the frame in order to permit the change in shape of the partial loop.

In an advantageous development, the at least one partial coil is produced from an elastic rigid material, preferably from polyamide or the like.

According to the invention, the partial coils of the compressed air line form a spiral, which is wound around the support at a predefined distance from the support.

In an advantageous development, the at least one partial loop is produced from a flexible hose material, for example it is implemented as a fabric-covered rubber hose.

In an advantageous development, the partial loop is dimensioned in such a way that, in a central position of the seat, the partial loop has a mechanically unstressed shape which is changed, specifically either extended or compressed during a translational movement of the seat.

In a preferred development, the second end of the support is arranged opposite the first end of the support. The rotation of the seat is preferably carried out about a longitudinal axis of the support.

In summary, in the present invention, a rotation of the seat in a first direction (e.g. clockwise) effects an enlargement in the distance or the radius of the partial coils, while a rotation of the seat in a second direction opposite thereto (e.g. counterclockwise) effects a reduction in the radius of the partial coils.

In a corresponding way, a translational movement of the seat in a first direction (e.g. parallel to a direction of travel of the rail vehicle directed forward) effects an extension of the at least one partial loop, while a translational movement of the seat in a second direction opposite thereto (e.g. parallel to a direction of the travel of the rail vehicle directed rearward) effects a compression of the at least one partial loop.

A number of partial coils or coils needed for the functionality and the associated nominal radius are matched to a permissible predefined rotational angle of the seat and to a predefined diameter of the support.

By means of the selection of the material for the at least one partial coil and for resultant coils, a predefined shape and position is ensured.

By means of the present invention, a long-lasting driver's seat configuration is achieved, and therefore a high quality standard of the seat construction is ensured.

The present invention avoids the disadvantageous undefined deformation of the flexible compressed air hose that is known from the prior art, which arises in particular as a result of superimposing the rotational and displacement movement.

By means of the present invention, chafing and bending points on the compressed air line are avoided.

By means of the present invention, separation of compressed air supply into a proportion for the seat rotational movement and into a proportion for the seat displacement movement is implemented.

The present invention makes it possible to optimize the respective material of the compressed air line and therefore its mechanical properties to the movement profile.

By means of the present invention, the compressed air supply is divided into two functionalities or component parts. A first proportion is provided exclusively for the compensation of the rotational movement of the seat, while a second proportion is provided exclusively for the compensation of the translational movement of the seat.

The present invention will be explained in more detail below by way of example with reference to a drawing, in which:

BRIEF DESCRIPTION OF THE FIGURES

FIG. 2 shows an advantageous development of the driver's seat according to the invention with reference to FIG. 1.

DETAILED DESCRIPTION OF THE INVENTION

Figure 1:
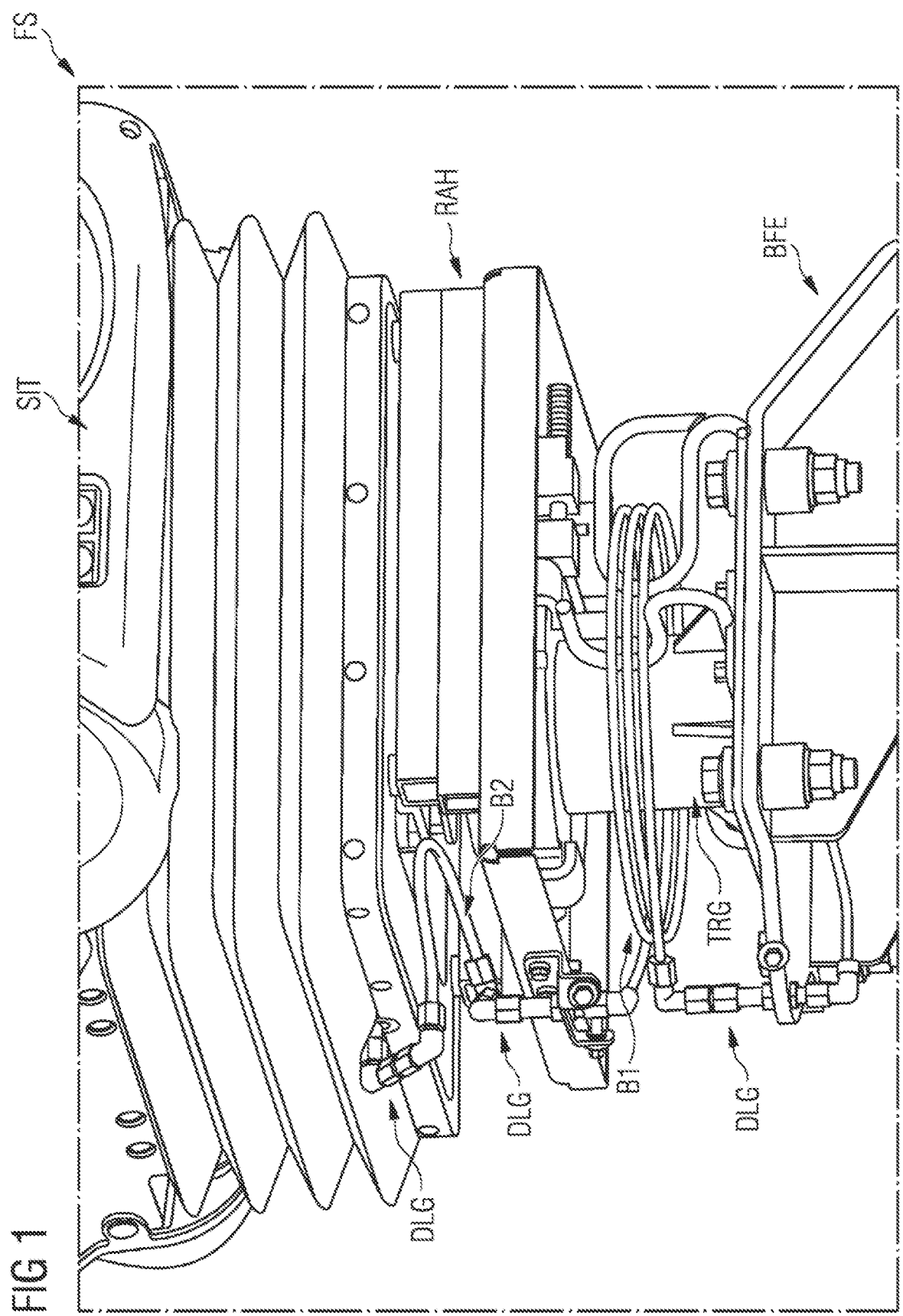
FIG. 1 shows a configuration of the driver's seat according to the invention.

FIG. 1 shows a configuration of the driver's seat FS according to the invention.

The driver's seat FS includes compressed-air assisted functionalities which are functionally ensured and implemented via a compressed air line DLG, which is part of the driver's seat FS.

The driver's seat FS has a seat SIT, a frame RAH, a support TRG and a fastening unit BFE.

The seat SIT is connected to a first end of the support TRG via the frame RAH, which supports the seat SIT. A second end of the carrier TRG is connected to the fastening unit BFE.

The seat SIT is designed for use by a rail vehicle driver and is rotatably mounted about an axis of the support TRG.

The fastening unit BFE is designed for a fastening of the support TRG in a control console of the rail vehicle (not specifically illustrated here).

The compressed air line DLG in a first region B1 is implemented as at least one partial coil, which runs radially around the support TRG.

The at least one partial coil is formed and fastened in such a way that a rotational movement of the seat SIT effects a change in the radius of the partial coil.

Thus, the radius change compensates for the rotational movement of the seat SIT that is carried out.

The compressed air line DLG in a second region B2 is implemented as at least one partial loop. This partial loop is formed and fastened in such a way that a translational movement of the seat SIT is compensated by a change in shape of the partial loop.

The frame RAH which supports the seat SIT is rotatably connected to a first end of the support such that the seat is rotatable.

The second end of the support TRG is arranged opposite the first end of the support TRG. Here, the support TRG is formed as a tube, which is arranged standing substantially vertically between the fastening unit BFE and the frame RAH.

A pneumatic suspension and/or pneumatic seat adjustment, to which the compressed air line DLG is fed to implement the pneumatic functionality, is arranged between the frame RAH and the seat SIT.

The first region B1 of the compressed air line DLG (with the at least one partial coil) is connected at its first end to the fastening unit BFE and by its second end to the frame RAH. As a result, it is fixed such that the above-described change in radius of the at least one partial coil is permitted.

In a preferred development, the second region B2 of the compressed air line (with the at least one partial loop) is connected at its first end to the seat SIT and to the pneumatic suspension and/or to the pneumatic seat adjustment, while its second end is connected to the frame RAH. As a result, it is fixed such that the above-described change in shape of the partial loop is permitted.

The partial coil is produced from an elastic rigid material, for example from polyamide or the like.

As illustrated here, a plurality of partial coils of the compressed air line DLG form a spiral, which is wound around the support TRG at a predefined distance from the support TRG.

FIG. 2 shows an advantageous development of the driver's seat according to the invention with reference to FIG. 1.

Additional protective sheets SCHB are provided to protect the compressed air hose and its fastenings against damage.

The invention claimed is:

1. A driver's seat (FS) for a rail vehicle, the driver's seat comprising:
   a seat (SIT), a frame (RAH), a support (TRG) having first and second ends, a fastening unit (BFE) and a compressed air line (DLG) ensuring compressed-air assisted functionalities of the driver's seat (FS);
   said frame (RAH) supporting said seat (SIT) and being rotatably mounted and connected to said first end of said support (TRG), permitting said seat (SIT) to rotate about an axis of said support (TRG);
   said second end of said support (TRG) connected to said fastening unit (BFE) for fastening said support (TRG) in a control console of the rail vehicle;
   said compressed air line (DLG) ensuring the compressed-air assisted functionalities of said seat (SIT);
   said compressed air line (DLG) having a first region (B1) implemented as a plurality of partial coils running at least partly radially around said support (TRG) at a predefined distance;
   said partial coils being formed and fastened to cause a rotational movement of said seat (SIT) to effect a change in the distance of said partial coils relative to said support (TRG); and
   said partial coils of said compressed air line (DRG) forming a spiral wound around said support (TRG) at a predefined distance from said support (TRG).

2. The driver's seat according to claim 1, which further comprises at least one of a pneumatic suspension or a pneumatic seat adjustment disposed between said frame and said seat and being fed by said compressed air line to implement and ensure the pneumatic functionality.

3. The driver's seat according to claim 1, wherein said support is formed as a tube or as a profile standing substantially vertically between said fastening unit and said frame.

4. The driver's seat according to claim 1, wherein said first region of said compressed air line has a first end connected to said fastening unit and a second end connected to said frame, to permit a change in distance and a change in radius of said partial coils.

5. The driver's seat according to claim 1, wherein said partial coils are formed of an elastic rigid material.

6. The driver's seat according to claim 1, wherein said partial coils are formed of polyamide.

7. The driver's seat according to claim 1, wherein:
   said compressed air line has a second region (B2) implemented as at least one partial loop; and
   said at least one partial loop is formed and fastened to cause a translational movement of said seat to effect a change in a shape of said at least one partial loop.

8. The driver's seat according to claim 7, wherein said seat has a central position, and said partial loop is dimensioned to have a mechanically unstressed shape in said central position of said seat, being extended or compressed during a translational movement of said seat.

9. The driver's seat according to claim 7, wherein said at least one partial loop is formed of a flexible hose material.

10. The driver's seat according to claim 9, wherein said seat has a central position, and said partial loop is dimensioned to have a mechanically unstressed shape in said central position of said seat, being extended or compressed during a translational movement of said seat.

11. The driver's seat according to claim 7, which further comprises:
    at least one of a pneumatic suspension or a pneumatic seat adjustment disposed between said frame and said seat and being fed by said compressed air line to implement and ensure the pneumatic functionality;
    said second region of said compressed air line having a first end connected to at least one of said seat or said at least one of a pneumatic suspension or a pneumatic seat adjustment; and
    said second region of said compressed air line having a second end connected to said frame to permit a change in shape of said partial loop.

12. The driver's seat according to claim 11, wherein said seat has a central position, and said partial loop is dimensioned to have a mechanically unstressed shape in said central position of said seat, being extended or compressed during a translational movement of said seat.

13. The driver's seat according to claim 11, wherein said at least one partial loop is formed of a flexible hose material.

14. The driver's seat according to claim 13, wherein said seat has a central position, and said partial loop is dimensioned to have a mechanically unstressed shape in said central position of said seat, being extended or compressed during a translational movement of said seat.

* * * * *